United States Patent [19]
Hatanaka

[11] Patent Number: 5,917,561
[45] Date of Patent: Jun. 29, 1999

[54] LIQUID-CRYSTAL IMAGE PROJECTING APPARATUS HAVING A COLOR PURITY CORRECTION FILTER

[75] Inventor: Masato Hatanaka, Saitama, Japan

[73] Assignee: Sony Corporation, Tokyo, Japan

[21] Appl. No.: 08/956,451

[22] Filed: Oct. 23, 1997

[30] Foreign Application Priority Data

Oct. 31, 1996 [JP] Japan ................................. 8-290804

[51] Int. Cl.⁶ ...................... G02F 1/1335; G02F 1/1347
[52] U.S. Cl. ................................. 349/8; 349/5; 349/80
[58] Field of Search ...................... 349/5, 8, 80

[56] References Cited

U.S. PATENT DOCUMENTS

| | | | |
|---|---|---|---|
| 4,389,118 | 6/1983 | Yuasa et al. ............................. | 356/404 |
| 5,105,265 | 4/1992 | Sato et al. ................................ | 349/8 |
| 5,659,409 | 8/1997 | Ooi et al. ................................. | 349/10 |
| 5,667,888 | 9/1997 | Yoshida et al. ......................... | 428/336 |
| 5,691,785 | 11/1997 | Usui et al. .............................. | 349/8 |
| 5,696,564 | 12/1997 | Hatakeyama ............................ | 349/8 |
| 5,798,805 | 8/1998 | Ooi et al. ................................. | 349/10 |

FOREIGN PATENT DOCUMENTS

| | | | |
|---|---|---|---|
| 2699688 | 6/1994 | France ............................. | G02B 5/28 |
| 3141338 | 6/1991 | Japan ............................. | G03B 21/00 |
| WO 95/135486 | 12/1995 | WIPO . | |

*Primary Examiner*—William L. Sikes
*Assistant Examiner*—Tarifur R. Chowdhury
*Attorney, Agent, or Firm*—Jay H. Maioli

[57] ABSTRACT

The image processing apparatus includes a lamp, fly eye lenses, an R reflective dichroic mirror, an R liquid-crystal light valve, a G reflective dichroic mirror, a G liquid-crystal light valve, a B dichroic light valve, a dichroic prism, and a projection lens for projecting a synthesized color image. In addition, a color-impurity correcting filter is provided typically between the R reflective dichroic mirror and the mirror to form an inclination angle of 10 degrees with a normal axis Y perpendicular to the incident-light axis X in the clockwise rotational direction around a normal axis Z. As a result, the color purity of the image displayed on the screen is improved and the luminance distribution of the displayed image can also be made uniform as well.

9 Claims, 8 Drawing Sheets

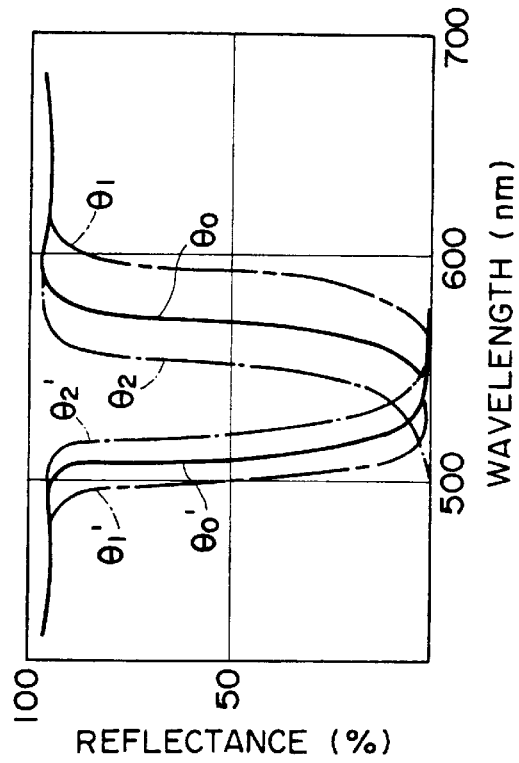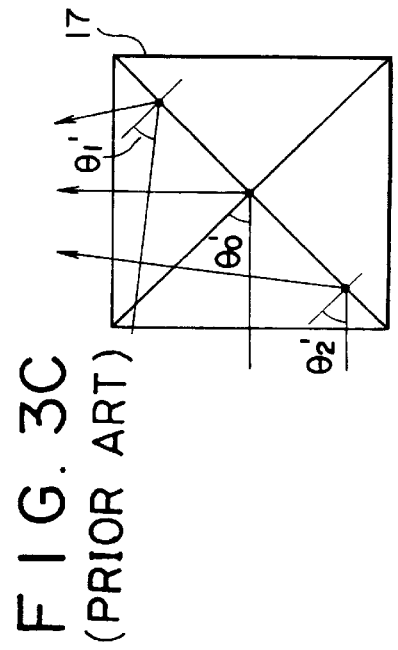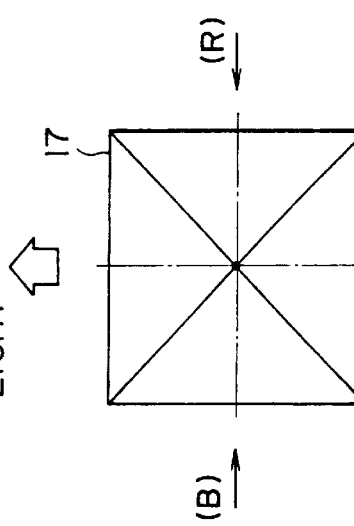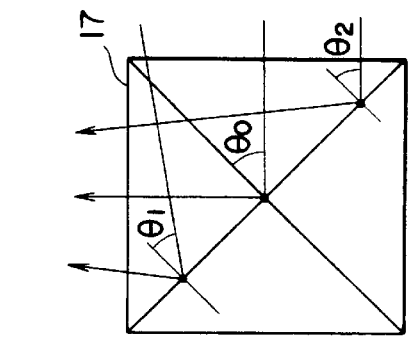
FIG. 3A (PRIOR ART)
FIG. 3B (PRIOR ART)
FIG. 3C (PRIOR ART)
FIG. 3D (PRIOR ART)

(PRIOR ART)

LIQUID-CRYSTAL IMAGE PROJECTING APPARATUS HAVING A COLOR PURITY CORRECTION FILTER

BACKGROUND OF THE INVENTION

1. Field of the Invention

The present invention relates in general to an image projecting apparatus such as a rear-type liquid-crystal projector and in particular to correction of color non-uniformity of a projected image in an image projecting apparatus.

2. Description of the Related Art

In the related art image projecting apparatus such as a rear-type liquid-crystal projector, a light passing through a liquid-crystal light valve is projected on a screen for displaying an image. To put it in detail, an illumination light comprising red (R), green (G) and blue (B) color components is generated by a light source such as a metal halide lamp. The illumination light is passed through spectroscopic means to produce R, green G and blue B illumination lights. The R, G and B illumination lights then pass through their respective liquid-crystal light valves which are driven by using red, green and blue color signals. After the R, G and B illumination lights passing through the respective liquid-crystal light valves are synthesized by using a synthesizing means, they are projected on a screen from the rear side thereof by a projection means, forming a color projected image on the screen.

FIG. 1 is a diagram showing a typical configuration of the related art rear-type liquid-crystal projector. As shown in the figure, a lamp 1 radiates a light comprising red (R), green (G) and blue (B) color components. The light radiated by the lamp 1 is applied to fly eye lenses 2 and 3 which serve as an optical integrator. The fly eye lenses 2 and 3 focus a light generated by a lamp before radiating the focused light to a liquid-crystal light valve uniformly as shown in FIG. 2, a diagram showing the operation of fly eye lenses.

In actuality, the R color component passing through the fly eye lenses 2 and 3 is reflected by an R dichroic mirror 4 and a mirror 5, being directed to an R liquid-crystal light valve 7 through a condenser lens 6 for converting the R color component into all but parallel beams as shown in FIG. 1.

By the same token, the G color component passing through the R dichroic mirror 4 is reflected by a G dichroic mirror 8, being directed to a G liquid-crystal light valve 10 through a condenser lens 9 for converting the G color component into all but parallel beams.

After leaving the G dichroic mirror 8, the remaining B color light component passes through a relay lens 11, a mirror 12 and a relay lens 13 and is reflected by a mirror 14. The B color component is then converted by a condenser lens 15 into all but parallel beams which are applied to a B liquid-crystal light valve 16.

In each of the R liquid-crystal light valve 7, the G liquid-crystal light valve 10 and the B liquid-crystal light valve 16 which are driven by their respective video signals, an optical image is formed as variations in transmittance due to a video signal applied thereto. Lights output by the R liquid-crystal light valve 7, the G liquid-crystal light valve 10 and the B liquid-crystal light valve 16 are synthesized by a dichroic prism 17 into a single light, substantially forming a color image at the position of the G liquid-crystal light valve 10.

The dichroic prism 17 is a prism-type dichroic mirror built by joining four rectangular prisms 17a, 17b, 17c and 17d. An R reflective dichroic multi-layer film and a B reflective dichroic multi-layer film are deposited on junction surfaces 19 and 20 inside the dichroic prism 17 respectively.

The color image synthesized by the dichroic prism 17 is enlarged by a projection lens 18, being projected on a screen, which is not shown in the figure, from the rear side thereof.

In the related art configuration described above, however, the light reaching the dichroic prism 17 has a predetermined incident inclination because the light has been converged before being radiated to the dichroic prism 17. For example, R light beams applied to the dichroic prism 17 shown in FIG. 3A, a diagram showing an enlarged view of the dichroic prism 17 as seen from a position above the prism 17, form different incident angles $\theta 0$, $\theta 1$ and $\theta 2$ with normal lines at the center, an upper portion and a lower portion of the junction surface 19 respectively as shown in FIG. 3B, a diagram showing incident angles of red light beams entering the dichroic prism 17. On the other hand, B light beams applied to the dichroic prism 17 shown in FIG. 3A form different incident angles $\theta 0'$, $\theta 1'$ and $\theta 2'$ with normal lines at the center, an upper portion and a lower portion of the junction surface 20 respectively as shown in FIG. 3C, a diagram showing incident angles of blue light beams entering the dichroic prism 17.

The dichroic multi-layer films deposited on the junction surfaces 19 and 20 inside the dichroic prism 17 each exhibit dependence on the incident angle, that is, a reflectance for a light which varies in dependence upon the incident angle of the light. As a result, when light beams are applied to the dichroic multi-layer film at different incident angles as described above, wavelength shifts are inadvertently generated as shown in FIG. 3D, a diagram showing characteristics of the dichroic prism 17 with respect to an S polarized light. As shown in FIG. 3D, with respect to the incident angle $\theta 0$, the wavelength is shifted to shortwave and longwave sides at the incident angles $\theta 2$ and $\theta 1$ respectively. As for the incident angle $\theta 0'$, the wavelength is shifted to shortwave and longwave sides at the incident angles $\theta 1'$ and $\theta 2'$ respectively.

The wavelength shifts occurring in the dichroic prism 17 considerably deteriorate the color purity of the liquid-crystal projector employing the dichroic prism 17 in the configuration thereof. When a red color is displayed on a screen, for example, a color close to a pure red color is displayed on the right half of the screen while color shading occurs on the left half, resulting in an orange color as shown in FIG. 4A, a diagram showing a front view of a display screen.

Such deterioration of a color purity has an effect on the luminance distribution of the displayed image as shown in FIG. 4B, a diagram showing a luminance distribution on a display screen. As shown in the figure, the left half of the screen exhibits bright luminance variations in comparison with the right half. For this reason, it is necessary to make the luminance distribution uniform by insertion of typically an attenuation filter for the left half of the screen, giving rise to a problem that such a filter deteriorates the efficiency of the utilization of the light in the liquid-crystal projector.

As a technique to solve such a problem, the thickness of the dichroic multi-layer film deposited on the junction surfaces 19 and 20 inside the dichroic prism 17 is changed in accordance with the incident angle of the light applied thereto. However, such a technique entails a complicated structure of the dichroic prism 17. In addition, introducing much waste of materials, the technique is economically undesirable.

SUMMARY OF THE INVENTION

The present invention addresses the problems described above. It is thus an object of the present invention to provide an image projecting apparatus which has excellent color purity and a uniform luminance distribution as a result of improvement of a wavelength shift of an incident light caused by the angle dependence of the dichroic prism and the dichroic mirror as encountered in the related art image projecting apparatus.

In order to solve the problems described above, the present invention provides an embodiment of an image projecting apparatus comprising:

a light source;

a color-component separating means for splitting a light generated by the light source into three color lights, that is, R, G and B lights;

three liquid-crystal light valves for modulating the three color lights output by the color-component separating means respectively;

a light synthesizing means for synthesizing modulated lights radiated by the three liquid-crystal light valves into a single light; and a projection means (or a projection lens) for projecting an image synthesized by the light synthesizing means on a screen, the image projecting apparatus characterized in that a color-purity correcting filter for correcting a screen color purity is provided on at least one of three optical paths passing through the three liquid-crystal light valves to form an inclination angle of about 10 degrees with a normal axis Y perpendicular to an incident-light axis X in a clockwise or counterclockwise rotational direction around a normal axis Z, a line of interception of a plane YZ perpendicularly crossing the incident-light axis X and a plane XZ perpendicularly crossing the normal axis Y.

In the image projecting apparatus according to an embodiment of the present invention, a color-purity correcting filter for correcting a screen color purity is provided on at least one of three optical paths passing through the three liquid-crystal light valves to form an inclination angle of about 10 degrees with the normal axis Y perpendicular to the incident-light axis X in the clockwise or counterclockwise rotational direction around the normal axis Z. Thus, the shift in incident-light wavelength is canceled. As a result, the color purity of the image displayed on the screen is improved and the luminance distribution of the displayed image can also be made uniform as well.

BRIEF DESCRIPTION OF THE DRAWINGS

The embodiments of the present invention are described by referring to the following diagrams wherein:

FIGS. 3A to 3D are explanatory diagrams used for clarifying a problem encountered in a dichroic prism wherein:

FIG. 3A is a diagram showing an enlarged view of a dichroic prism as seen from a position above the prism;

FIG. 3B is a diagram showing incident angles of red light beams entering the dichroic prism;

FIG. 3C is a diagram showing incident angles of blue light beams entering the dichroic prism; and FIG. 3D is a diagram showing characteristics of the dichroic prism with respect to an S polarized light;

FIGS. 4A and 4B are explanatory diagrams used for clarifying a problem encountered in the related art rear-type liquid-crystal projector caused by the characteristics of a dichroic prism wherein:

FIG. 4A is a diagram showing a front view of a display screen; and

FIG. 4B is a diagram showing a luminance distribution on the display screen;

DETAILED DESCRIPTION OF THE PREFERRED EMBODIMENTS

The present invention will become more apparent from a careful study of the following detailed description of some preferred embodiments with reference to accompanying diagrams.

First Embodiment

Figure 1:
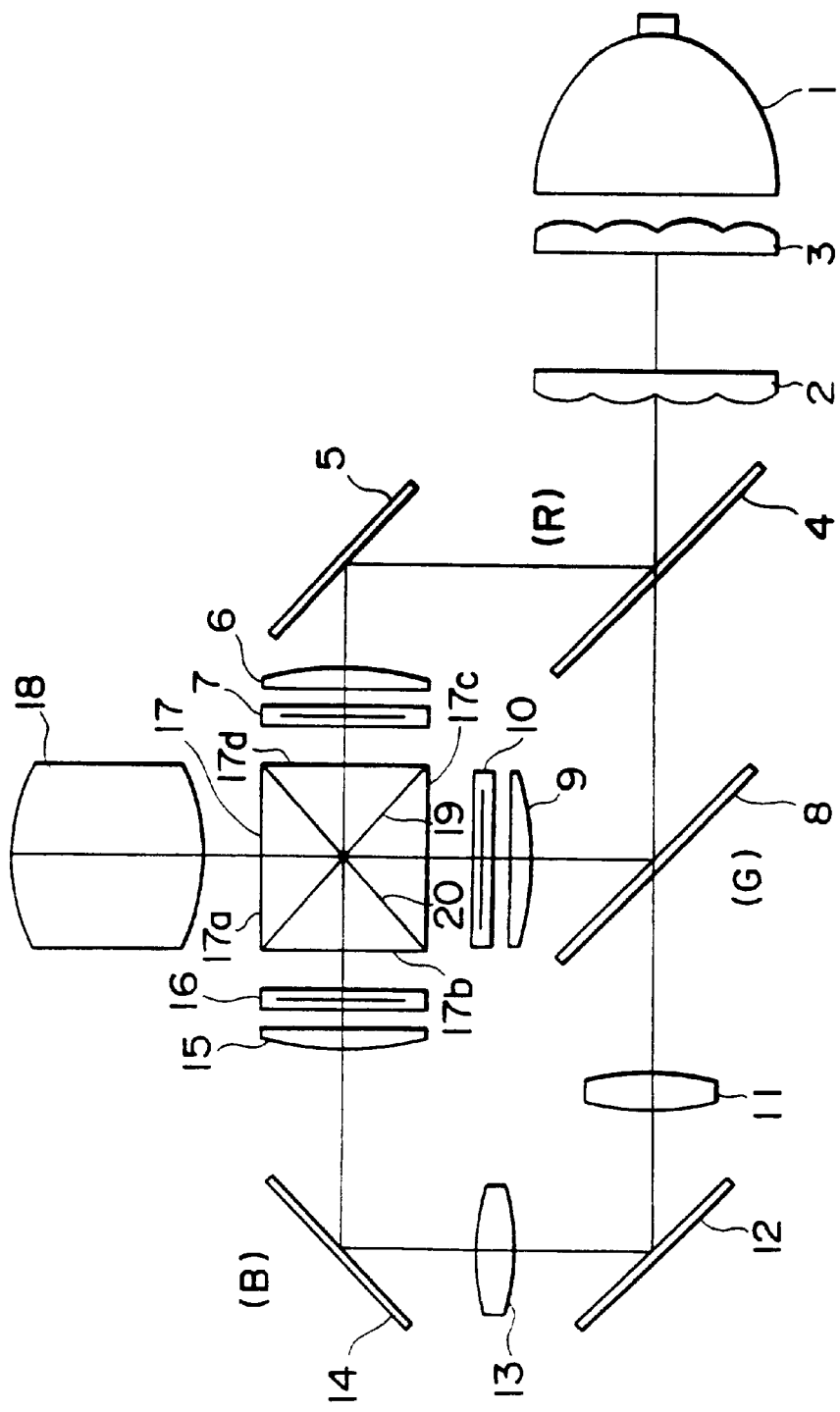
FIG. 1 is a diagram showing a typical configuration of the related art rear-type liquid-crystal projector.
Figure 2:
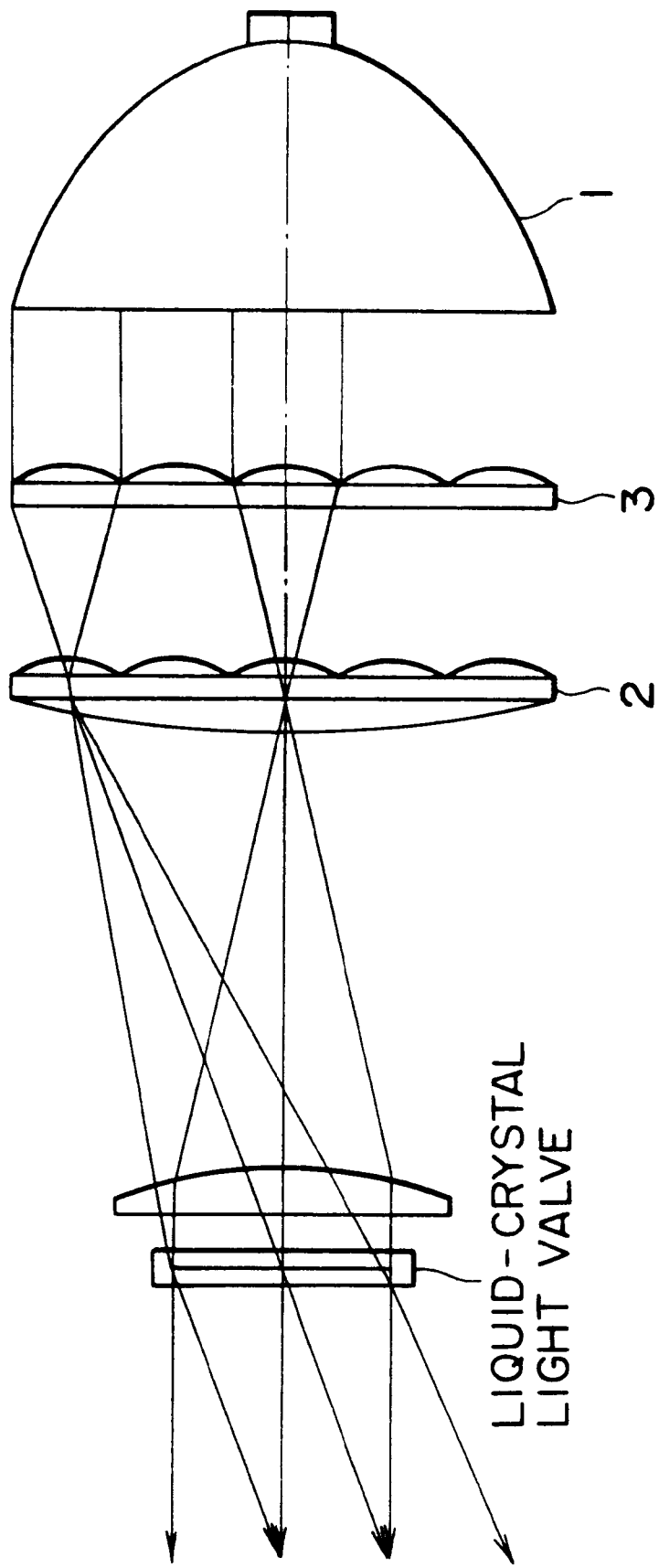
FIG. 2 is a diagram showing the operation of fly eye lenses.
Figure 4A:
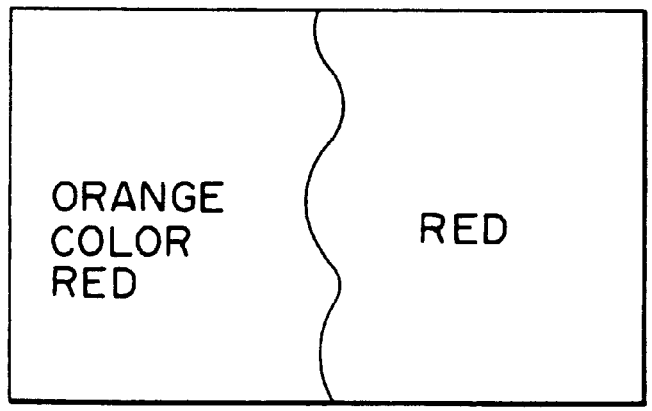
Figure 4B:
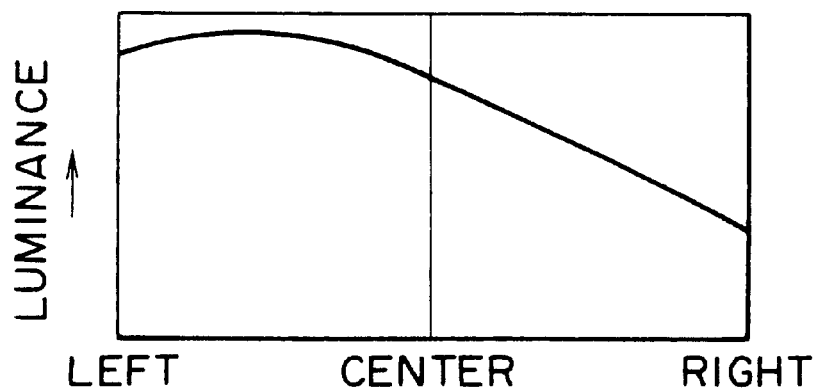
Figure 5:
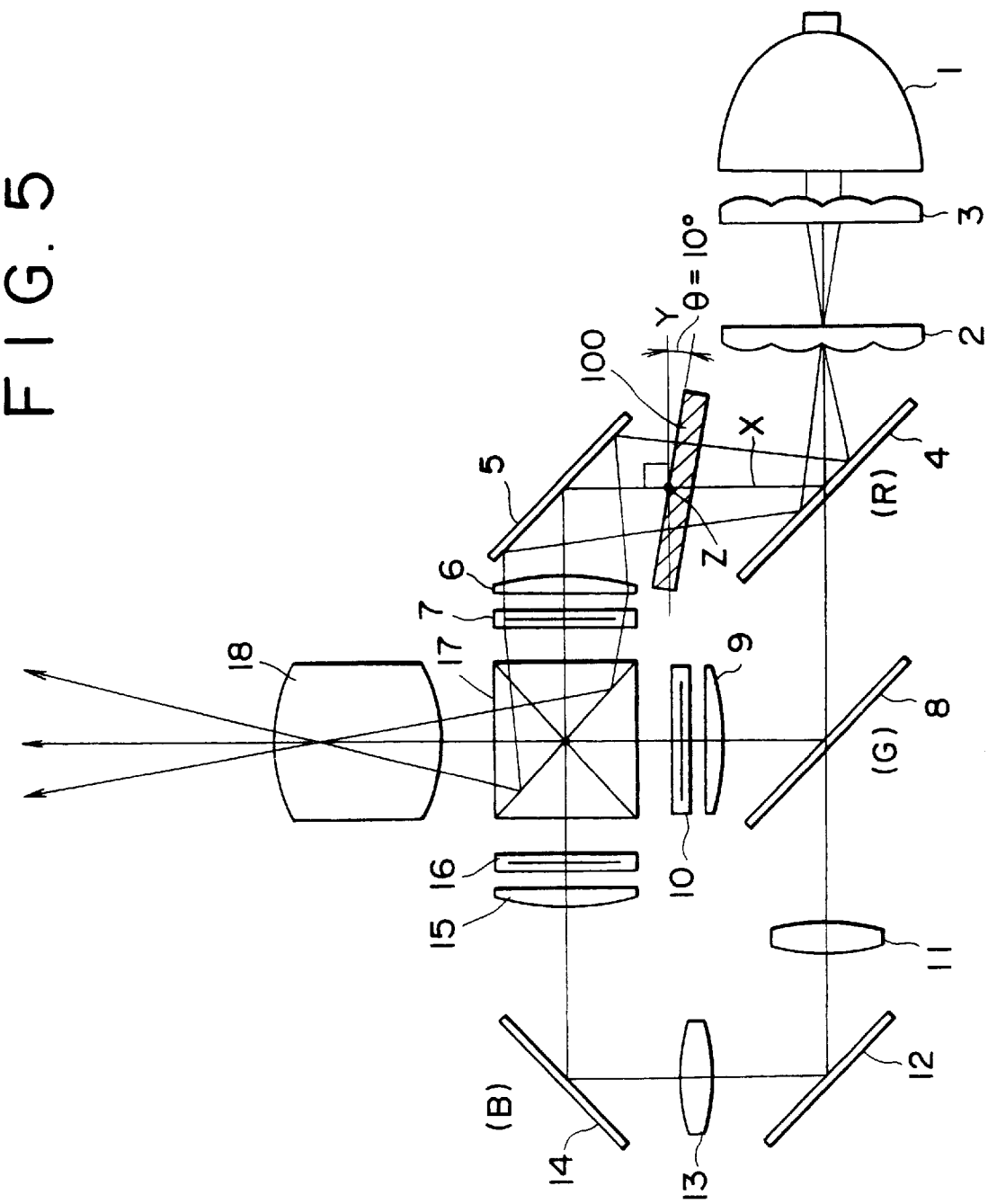
FIG. 5 is a diagram showing a view of a first embodiment implementing the image projecting apparatus provided by the present invention as seen from a position above the apparatus.

The configuration of an image projecting apparatus implemented by a first embodiment of the present invention is explained by referring to FIG. 5. FIG. 5 is a diagram showing a view of the first embodiment implementing the image projecting apparatus provided by the present invention as seen from a position above the apparatus. It should be noted that description of items already explained in the description of the prior art is not repeated and components common to the related art image projecting apparatus and the image projecting apparatus provided by the present invention are denoted by the same reference numerals and are not explained again.

The image processing apparatus adopting a cross-prism system like the one shown in FIG. 5 comprises a lamp 1, fly eye lenses 2 and 3, an R reflective dichroic mirror 4, a mirror 5, a condenser lens 6, an R liquid-crystal light valve 7, a G reflective dichroic mirror 8, a condenser lens 9, a G liquid-crystal light valve 10, relay lenses 11 and 13, mirrors 12 and 14, a condenser lens 15 and a B dichroic light valve 16.

The image processing apparatus is further provided with a dichroic prism 17 serving as a light synthesizing means for synthesizing lights output by the R liquid-crystal light valve 7, the G liquid-crystal light valve 10 and the B liquid-crystal light valve 16 and a projection lens 18 for projecting a synthesized color image resulting from a synthesis carried out by the dichroic prism 17 on a screen which is not shown in the figure.

Figure 6:
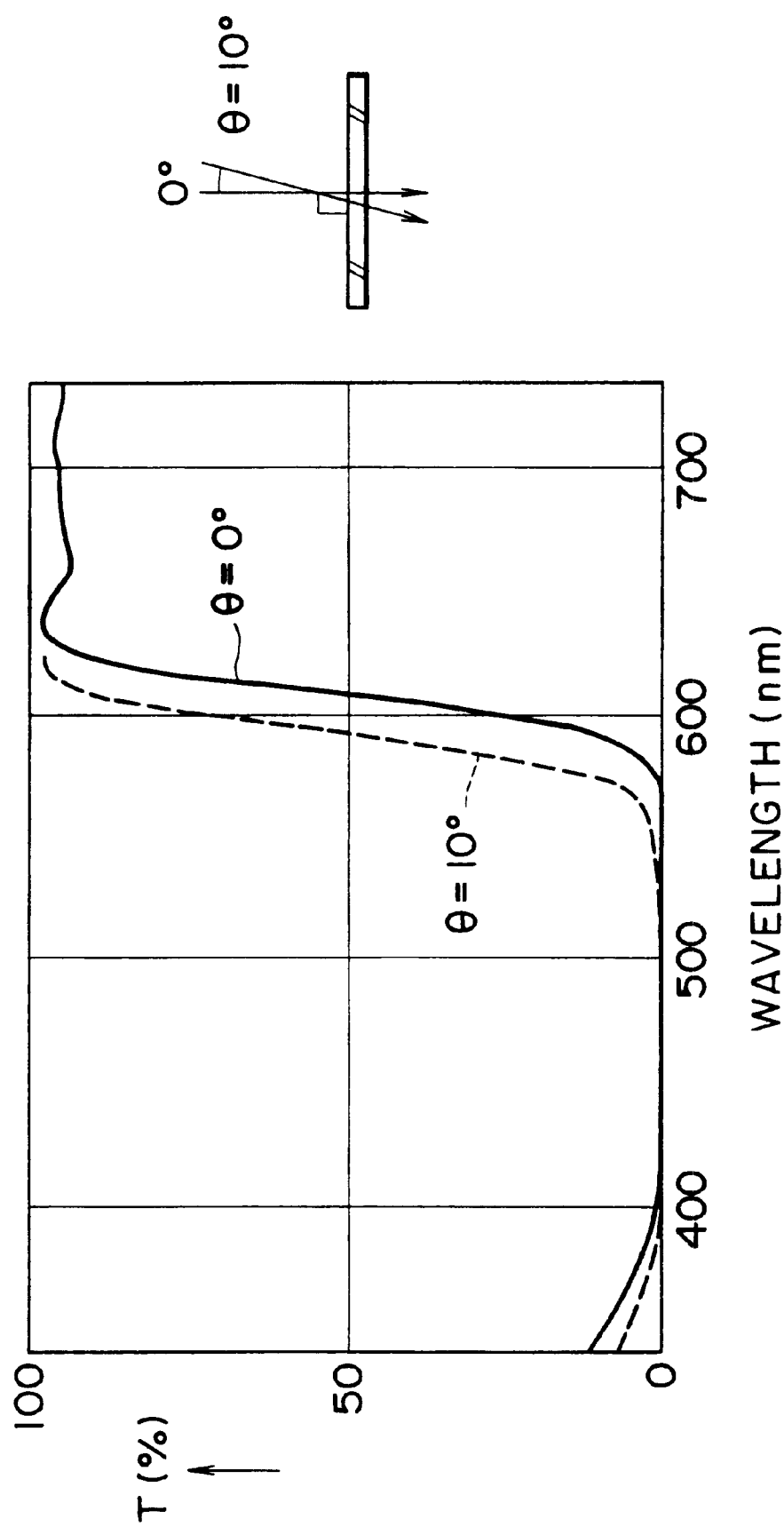
FIG. 6 is a diagram showing the characteristic of a color-purity correcting filter provided by the present invention with respect to the red color.

The image projecting apparatus provided by the present invention is equipped with a color-impurity correcting filter 100, the characteristic of which is shown in FIG. 6. Serving as a color trimming filter for correcting the color purity of the synthesized color image, the color-impurity correcting filter 100 is provided typically between the R reflective dichroic mirror 4 and the mirror 5 to form an inclination angle of 10 degrees with a normal axis Y perpendicular to the incident-light axis X in the clockwise rotational direction around a normal axis Z, a line of interception of a plane YZ perpendicularly crossing the incident-light axis x and a plane XZ perpendicularly crossing the normal axis Y.

The operation of the image projecting apparatus having a configuration described above is described as follows.

The lamp 1 emits a light comprising R, G and B color components. The light emitted by the lamp 1 is converted by the fly eye lenses 2 and 3 into a light which can be radiated uniformly to the R, G and B liquid-crystal light valves 7, 10 and 16 for the R, G and B color components respectively. The R color component of the light passing through the fly eye lenses 2 and 3 is reflected by the R reflective dichroic mirror 4, being directed to the color-purity correcting filter 100 which is provided at an angle of inclination as described above. The color-purity correcting filter 100 is a dichroic filter made of glass or a metal such as a film with a thickness of the order of several micrometers having an excellent transmittance characteristic such as $TiO_2$ or $SiO_2$ is created by a deposition method to provide a uniform optical characteristic on the surface thereof.

The inventors of the present invention have discovered in an experiment using the color-purity correcting filter 100 made as described above that, by providing the color-purity correction filter 100 to form an inclination angle θ of 10 degrees with a normal axis Y perpendicular to the incident-light axis X in the clockwise rotational direction around a normal axis Z, the shift in incident-light wavelength is canceled due to the characteristic of the color-purity correcting filter 100 shown in FIG. 6.

This is because, since the color-purity correcting filter 100 is provided at an inclination angle θ of 10 degrees in the clockwise rotational direction seen from a position above the image projecting apparatus as shown in FIG. 5, an R light passing through the color-purity correcting filter 100 undergoes reversed correction therein which just have effects opposite to wavelength shifts occurring in the dichroic prism 17 at incident angles as shown in FIG. 3 (an explanatory diagram used for clarifying a problem encountered in the related art rear-type liquid-crystal projector) so that the shift in incident-light wavelength is just canceled by the characteristic of the color-purity correcting filter 100 shown in FIG. 6. As a result, the color purity of the image displayed on the screen is improved and the luminance distribution of the displayed image can also be made uniform as well. The rest of the operation is the same as the related art image projecting apparatus adopting the traditional technology, making it unnecessary to repeat the explanation thereof.

Second Embodiment

Figure 7:
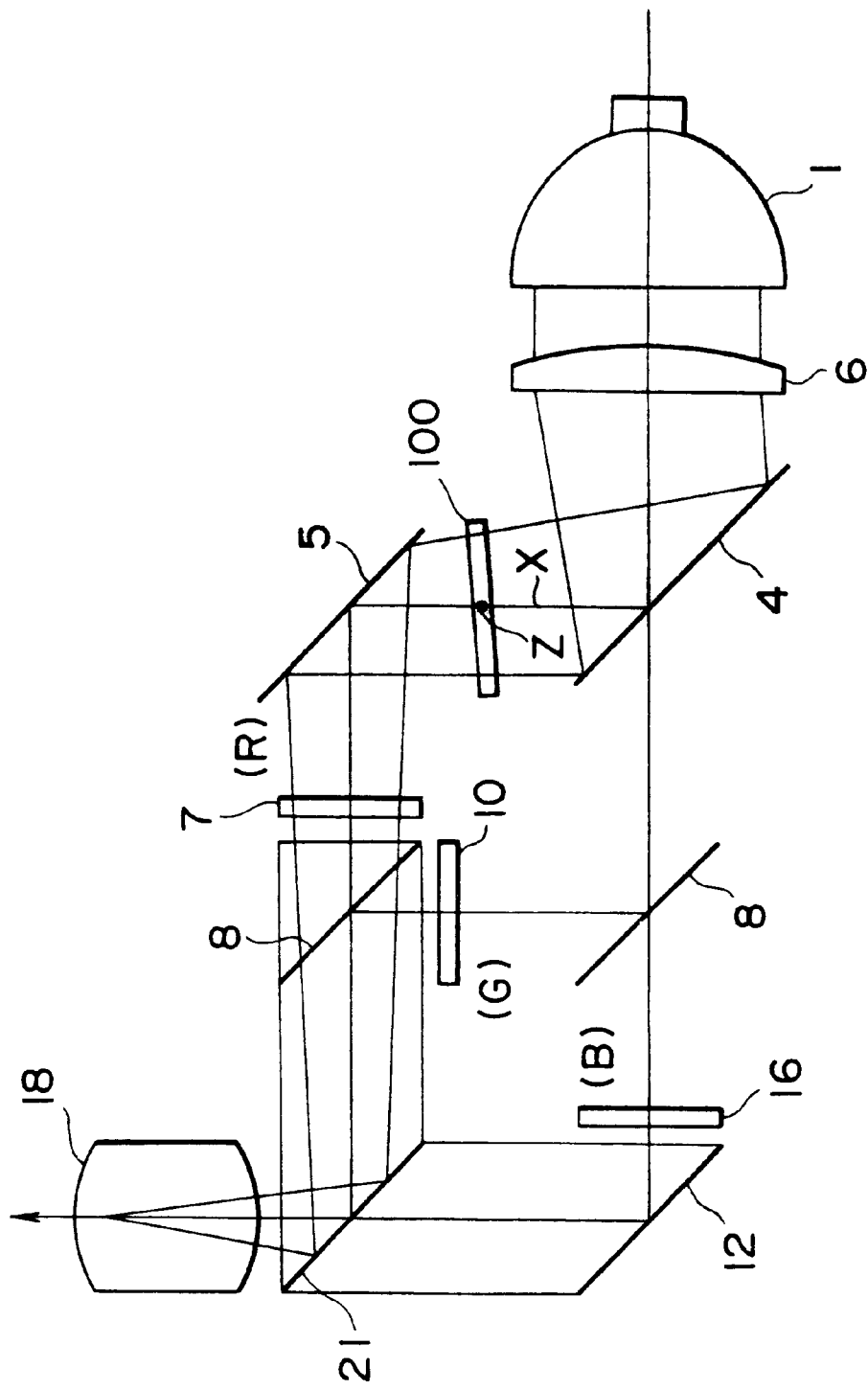
FIG. 7 is a diagram showing a view of a second embodiment implementing the image projecting apparatus provided by the present invention as seen from a position above the apparatus.

The second embodiment adopts an L-type prism system in place of the cross-prism system embraced by the first embodiment. The second embodiment is explained by referring to FIG. 7. FIG. 7 is a diagram showing a view of the second embodiment implementing the image projecting apparatus provided by the present invention as seen from a position above the apparatus.

As shown in the figure, the image projecting apparatus implemented by the present embodiment comprises a lamp 1, a condenser lens 6, an R reflective dichroic mirror 4, a mirror 5, an R liquid-crystal light valve 7, a G reflective dichroic mirror 8, a G liquid-crystal light valve 10, a B liquid-crystal light valve 16, a mirror 12, a yellow (Y) reflective dichroic mirror 21 and a projection lens 18.

In addition, a color-impurity correcting filter 100 provided by the present invention is provided typically between the R reflective dichroic mirror 4 and the mirror 5 to form an inclination angle of 10 degrees with the normal axis Y perpendicular to the incident-light axis X in the counter-clockwise rotational direction around the normal axis Z, a direction opposite to the angle of inclination of the color-impurity correcting filter employed in the first embodiment. As a result, the color purity of the image displayed on the screen is improved and the luminance distribution of the displayed image can also be made uniform as well. The rest of the operation is the same as the related art image projecting apparatus adopting the traditional technology, making it unnecessary to repeat the explanation thereof.

Third Embodiment

Figure 8:
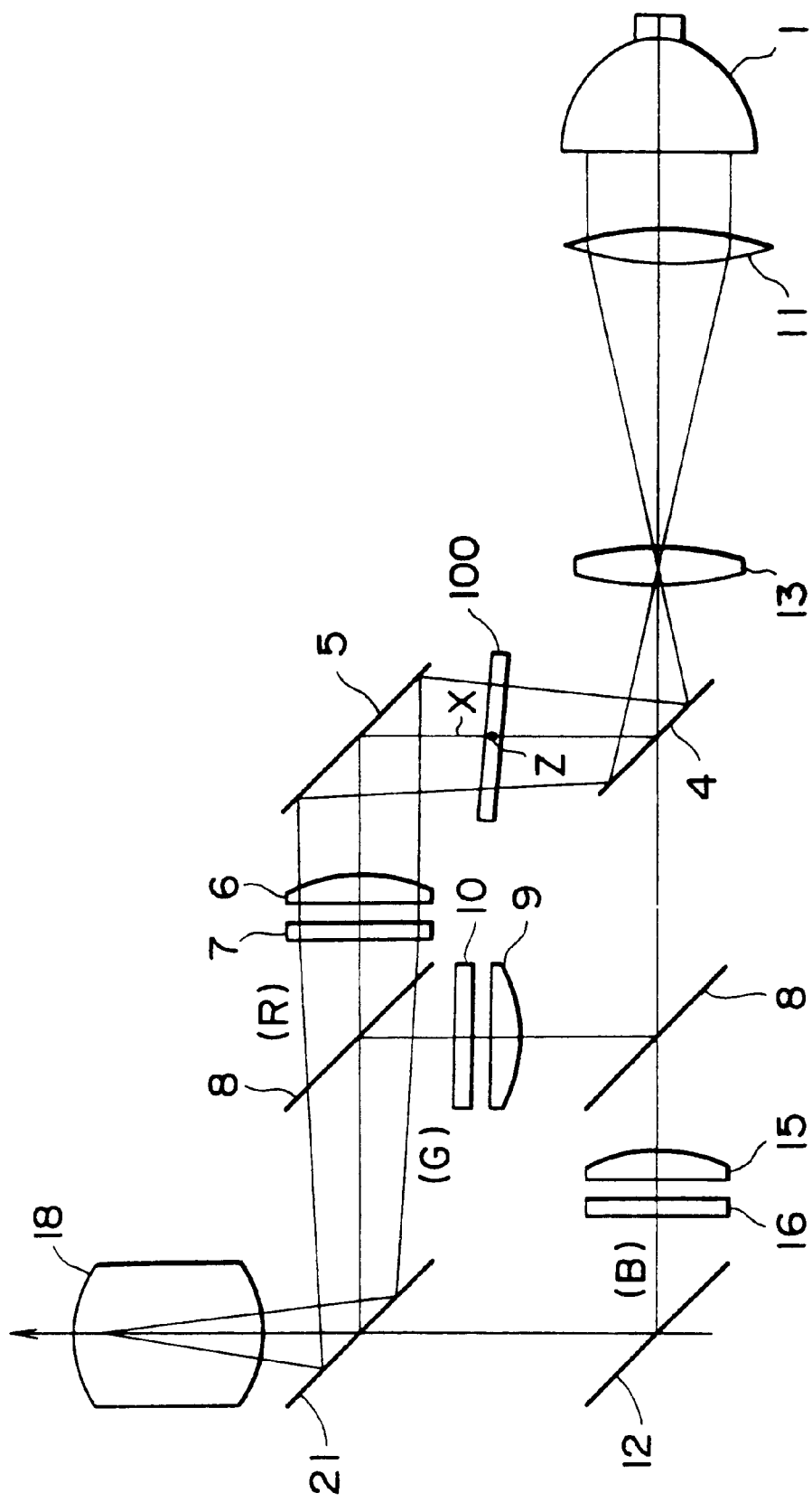
FIG. 8 is a diagram showing a view of a third embodiment implementing the image projecting apparatus provided by the present invention as seen from a position above the apparatus.

The third embodiment is an embodiment implementing another version of the L-type prism system. The third embodiment is explained by referring to FIG. 8. FIG. 8 is a diagram showing a view of the third embodiment implementing the image projecting apparatus provided by the present invention as seen from a position above the apparatus.

The image processing apparatus adopting a modified version of the L-type-prism system like the one shown in FIG. 8 comprises a lamp 1, relay lenses 11 and 13, an R reflective dichroic mirror 4, a mirror 5, a condenser lens 6, an R liquid-crystal light valve 7, a G reflective dichroic mirror 8, a condenser lens 9, a G liquid-crystal light valve 10, a condenser lens 15 and a B liquid-crystal light valve 16, a mirror 12 a yellow (Y) reflective dichroic mirror 21 and a projection lens 18.

In addition, a color-impurity correcting filter 100 provided by the present invention is provided typically between the R reflective dichroic mirror 4 and the mirror 5 to form an inclination angle of 10 degrees with the normal axis Y perpendicular to the incident-light axis X in the clockwise rotational direction around the normal axis Z. As a result, the color purity of the image displayed on the screen is improved and the luminance distribution of the displayed image can also be made uniform as well. The rest of the operation is the same as the related art image projecting apparatus adopting the traditional technology, making it unnecessary to repeat the explanation thereof.

While the present invention has been described by referring to the illustrative embodiments, the description is not intended to be construed as limiting. That is to say, the scope of the present invention is not limited to the preferred embodiments described above and, thus, a variety of changes and modifications can be made to the embodiments. For example, the present invention is applied to a rear-type liquid-crystal projector in the description given above. It should be noted, however, that the present invention can of course be applied to a front-type liquid-crystal projector as well. In addition, while the color-purity correcting filter 100 is inserted on the R optical path of each of the embodiments described above, the color-purity correcting filter 100 can also be provided on the G or B optical path depending on the state of an image displayed on the screen of the image projecting apparatus. On top of that, it is needless to say that various versions of the present invention can also be developed without adhering to the preferred embodiments described above.

What is claimed is:

1. An image projecting apparatus comprising:
   a light source;
   color-component separating means for splitting an output generated by said light source into red, green and blue color components;
   three liquid-crystal light valves each for modulating one of said red, green and blue color components output by said color-component separating means;
   light synthesizing means for synthesizing said modulated lights output by said three liquid-crystal light valves into a single light;

projection means for projecting an image corresponding to said single light synthesized by said light synthesizing means on a screen; and a color-purity correcting filter for correcting a color purity of said image projected on said screen, wherein said color-purity correcting filter is provided on one of three optical paths passing through said three liquid-crystal light valves and forming a predetermined angle of inclination with respect to a normal axis perpendicular to an incident-light axis, and said color-purity correcting filter is formed as a film of one of $TiO_2$ and $SiO_2$ with a thickness in the order of micrometers formed by a deposition method, thereby having an excellent transmittance characteristic.

2. The image projecting apparatus according to claim 1, wherein a dichroic prism is employed as said light synthesizing means.

3. The image projecting apparatus according to claim 1, wherein a dichroic mirror is employed as said light synthesizing means.

4. The image projecting apparatus according to claim 1, wherein said predetermined angle of inclination formed by said color-purity correcting filter and said normal axis has a value in the range from 8 to 15 degrees in one of a clockwise and counterclockwise rotational direction from said normal axis.

5. The image projecting apparatus according to claim 1, wherein said predetermined angle of inclination formed by said color-purity correcting filter and said normal axis has a value of 10 degrees in one of a clockwise and counterclockwise rotational direction from said normal axis.

6. The image projecting apparatus according to claim 1, wherein said color-purity correction filter is a color trimming filter for correcting color purity.

7. The image projecting apparatus according to claim 1, wherein said color-purity correcting filter has a uniform optical characteristic on a surface thereof.

8. The image projecting apparatus according to claim 1, wherein said color-purity correction filter is made of one of glass and a metal.

9. The image projecting apparatus according to claim 1, wherein said apparatus is a rear-type liquid-crystal projector.

* * * * *